United States Patent [19]
Hock et al.

[11] Patent Number: 5,613,705
[45] Date of Patent: Mar. 25, 1997

[54] AIRBAG INFLATOR HAVING A HOUSING PROTECTED FROM HIGH-TEMPERATURE REACTIVE GENERATED GASES

[75] Inventors: Christopher Hock, Uintah; Gerold W. Pratt, Bountiful; Michael P. Jordan, South Weber; Alan J. Ward, N. Ogden, all of Utah

[73] Assignee: Morton International, Inc., Chicago, Ill.

[21] Appl. No.: 410,626

[22] Filed: Mar. 24, 1995

[51] Int. Cl.⁶ .................................................. B60R 21/16
[52] U.S. Cl. ............................................ 280/741; 280/736
[58] Field of Search ................................. 280/741, 736, 280/742; 102/530, 531, 202, 202.14; 222/3, 5; 422/164–167; 55/435

[56] References Cited

U.S. PATENT DOCUMENTS

| | | | |
|---|---|---|---|
| 3,267,672 | 8/1966 | Craig et al. | 60/39.47 |
| 3,741,585 | 6/1973 | Hendrickson et al. | 280/150 |
| 3,877,882 | 4/1975 | Lette et al. | 280/150 |
| 3,972,545 | 8/1976 | Kirchoff et al. | 280/735 |
| 3,985,076 | 10/1976 | Schneiter et al. | 280/729 |
| 4,066,415 | 1/1978 | Kasama et al. | 280/741 |
| 4,068,862 | 1/1978 | Ishi et al. | 280/740 |
| 4,131,299 | 12/1978 | Ono et al. | 280/736 |
| 4,178,017 | 12/1979 | Ishi et al. | 280/740 |
| 4,339,320 | 7/1982 | Friese et al. | 204/195 S |
| 4,369,079 | 1/1983 | Shaw | 280/728 |
| 4,414,902 | 11/1983 | Strasser et al. | 102/531 |
| 4,437,681 | 3/1984 | Adams et al. | 280/733 |
| 4,547,342 | 10/1985 | Adams et al. | 280/741 |
| 4,594,053 | 6/1986 | Sohngen | 415/174 |
| 4,902,036 | 2/1990 | Zander et al. | 280/743 |
| 4,931,112 | 6/1990 | Wardle et al. | 280/741 |
| 5,024,160 | 6/1991 | Canterberry et al. | 280/741 |
| 5,054,811 | 10/1991 | Unterforsthuber et al. | 280/742 |
| 5,056,815 | 10/1991 | Geisreiter | 280/736 |
| 5,064,510 | 11/1991 | Thoma et al. | 204/16 |
| 5,104,466 | 4/1992 | Allard et al. | 280/241 X |
| 5,116,080 | 5/1992 | Wipasuramonton | 280/741 |
| 5,136,952 | 8/1992 | Bennett | 102/530 |
| 5,139,280 | 8/1992 | Cord et al. | 280/741 |
| 5,217,697 | 6/1993 | Kanazawa et al. | 280/735 |
| 5,259,643 | 11/1993 | Kraft et al. | 280/740 |
| 5,306,041 | 4/1994 | Ogawa et al. | 280/741 |

FOREIGN PATENT DOCUMENTS

| | | |
|---|---|---|
| 0369579 | 5/1990 | European Pat. Off. |
| 405962 | 1/1991 | European Pat. Off. |
| 476886 | 3/1992 | European Pat. Off. |
| 496267 | 7/1992 | European Pat. Off. |
| 0694447 | 1/1996 | European Pat. Off. |
| 3921472 | 11/1990 | Germany |
| 3924500 | 12/1990 | Germany |
| 9218238 | 10/1993 | Germany |
| 4227547 | 2/1994 | Germany |

*Primary Examiner*—Christopher P. Ellis
*Attorney, Agent, or Firm*—Henry W. Tarring, II; Gerald K. White

[57] ABSTRACT

The present invention is directed to the use of protective layers on or adjacent to interior surfaces of the metal housings of gas generators, or inflators, used in automotive airbag systems. The protective layers are provided to protect such housings from deterioration which might otherwise be caused by impingement of the high temperature and chemically reactive generated gases and other associated reaction products on the interior surfaces of the housing. The protective layers can be in the form of coatings or platings on the housing surface or they can be provided as separate structures which shield specific portions of the housing's interior surfaces. The invention is particularly useful in protecting aluminum housings when they are used with the newer high reaction temperature non-azide gas generant materials.

26 Claims, 3 Drawing Sheets

AIRBAG INFLATOR HAVING A HOUSING PROTECTED FROM HIGH-TEMPERATURE REACTIVE GENERATED GASES

FIELD OF THE INVENTION

This invention relates to gas generators, or inflators, for use in vehicle airbag passive restraint systems. More particularly, the invention relates to protective structures, platings or coatings provided on, or adjacent to, portions of the inflator's housing to prevent damage thereto by the high temperature, chemically-reactive gases generated by the inflator's high reaction temperature gas generant compositions.

BACKGROUND OF THE INVENTION

Many of the airbag passive restraint systems used in modern vehicles rely on inflators which produce the gas needed to inflate the airbag by ignition of gas generant compositions. These compositions, once heated to their ignition temperature, combust to produce a large amount of gas in a relatively short period of time, thereby providing for the required rapid inflation of the airbag. It is also important that they provide the long term reliability required of airbag systems, which are expected to perform properly over the lifetime of the vehicle in which they are installed.

Recently, the most commonly used gas generant compositions have involved azide compounds, such as sodium azide, as the fuel component. As more fully explained in U.S. Pat. No. 3,741,585, these compositions provide long term reliability, relatively low reaction temperatures during the gas generation step, and non-toxic gas products. These compositions, however, are themselves toxic and are easily hydrolyzed. As explained in U.S. Pat. No. 4,369,079, they also readily react with heavy metals, such as copper, lead, etc., to form sensitive materials which are subject to unexpected ignition and detonation. These problems have led to the development of further gas generant compositions, such as the tetrazole and nitrotriazalone based compositions described in U.S. Pat. Nos. 4,369,079 and 4,931,112. The newer compositions, while described as providing a low temperature burn, nevertheless burn at temperatures significantly above the 200° to 1000° F. temperatures attributed to the azide based compositions in the previously noted U.S. Pat. No. 3,741,585. These newer compositions are part of a class of compositions which is often referred to in the art either as non-azide generants or as high reaction temperature generants. Hereinafter, we shall refer to this class of compounds as high reaction temperature generants.

A variety of materials have been used as the structural material in inflator housings, including steel, stainless steel and aluminum. Recently, aluminum has been favored due to its relative weight advantage, its long term corrosion resistance and its relative ease of processing. A particularly advantageous inflator, and method of fabricating such incorporating inertial welding, is described in U.S. Pat. No. 4,547,342.

All of the patents mentioned above are owned by the assignee of this application and are hereby incorporated by reference herein.

Testing of developmental prototypes of inflators similar to those described in U.S. Pat. No. 4,547,342, wherein gas generating materials within the non-azide or high reaction temperature generant category are used, has resulted in occasional localized failures of the inflator housing structure. It is an object of the present invention to provide inflator housing structures which are protected against such failures.

A related invention is described in U.S. patent application Ser. No. 08/411,002, filed on Mar. 27, 1995, and entitled "An Airbag Inflator With Components Protected From High-Temperature, Reactive Generated Gases". That application is assigned to the same assignee as is this case, and is incorporated by reference herein.

BRIEF SUMMARY OF THE INVENTION

The present invention is directed to an improvement in the inflator housing to permit the use of high temperature generants while avoiding the above noted problems. Accordingly, the present invention provides a protective layer on the interior of the inflator housing where it is particularly vulnerable to attack by the high temperature and chemical reactivity of the reaction products produced by the high temperature generants. These protective layers can be provided in the form of coatings or platings, or they can be provided as individual component parts or structures, prepared from metals, ceramics or heat resistant oxides.

While the invention is particularly intended to be used with inflators made of aluminum or aluminum alloys and which use high temperature gas generating compositions, the protection against chemically reactive reaction products provided by the protective layers can also be beneficial where the need therefore arises in inflators made of other materials or in inflators which use other gas generating compositions.

DETAILED DESCRIPTION OF THE INVENTION

Figure 1:
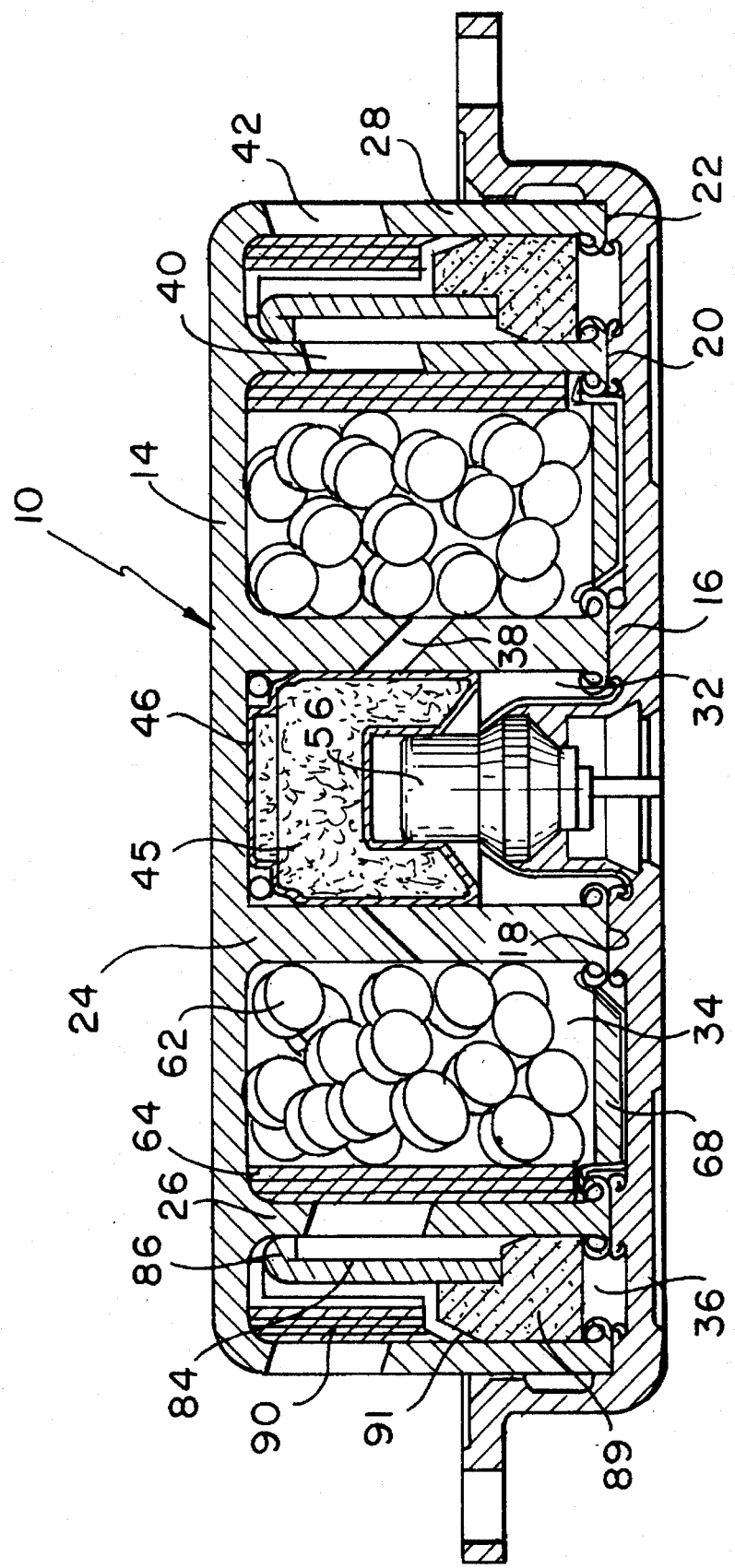
FIG. 1 is a sectional view of an inflator for use in a driver side airbag assembly in which protective layer coatings according to the present invention are provided.

The availability of proven inertial welding techniques, as described in U.S. Pat. No. 4,547,342, in conjunction with its relatively light weight and chemical stability have made aluminum the material of choice for inflator housings. While metal azides were, at one time, the gas generant material of choice for use in inflators, the newer gas generant materials, known generally as non-azide generants or high reaction temperature generants, offer compatibility, toxicity and safety advantages over the azide generants. Testing of these high reaction temperature generants in inflators which use aluminum for the housing has, on occasion, resulted in failures, such as burn through, of the aluminum housings. The present invention provides a protective layer to permit the use of the newer generants in aluminum housings without encountering the noted failures.

The improved inflator housings according to the present invention are provided with protective layers to protect the housing particularly in those locations where the high temperature and/or high degree of impingement of the generated reaction products result in deterioration of such portion of the housing due to the severe ablative and chemically reactive conditions produced by the generated reaction products. In the absence of such protective layers, it would be necessary to modify the inflator by either providing much thicker and, therefore, heavier, construction in the portions subjected to such severe conditions, or by changing to a different structural material, which would be heavier and/or more expensive to purchase and fabricate, than the protected housings provided by the present invention. We have found that such particularly severe conditions are generally found in locations where the generated reaction products are at higher temperatures, i.e. before they have been significantly cooled, and/or where they have their greatest degree of impingement on the housing, either because of high flow velocity in such location or because the housing functions in that location to change the direction of flow of such reaction products. While careful consideration of inflator designs in light of these teachings should serve to identify locations subject to the noted severe conditions, test firings of the inflators and careful inspection of the resulting fired housings will identify those structural locations where protective layers should be applied.

The protective layers can be provided as coatings or platings on the internal surface of the housing, or they can be provided as a separate structure positioned adjacent the portion of the housing to be protected. The protective layers which are provided as coatings or platings are generally comprised of erosion-resistant and chemical-resistant materials, which are hereinafter referred to as reactivity resistant materials. Ceramics, such as boron nitride, calcium silicate, aluminum silicate, alumina, silica or zirconia can be coated on the surface to be protected by the use of a volatile carrier or by painting. Metals, such as copper, nickel or zinc, can be provided as a coating or plating by techniques such as electroplating, chemical plating, using a volatile carrier, dipping in the molten metal or painting. When the surface to be protected is aluminum or an alloy thereof, a protective coating of aluminum oxide can be provided by anodizing techniques. While such materials can also be used when the protective layer is provided as a separate structure, the greater thickness of such a separate structure (than the thickness of protective coatings), permits the use of energy blocking materials having somewhat less ablation resistance and chemical resistance than the reactivity resistant materials suitable for use as coatings. The greater thickness of such a separate structure allows a limited degree of ablation or other degradation of such structure without compromising the protection provided the shielded portion of the housing. In particular, we have found that steels, such as carbon steel and stainless steel, are effective materials for use as separate structure protective layers.

The inflator depicted in FIG. 1 is an improved modification of the inflator illustrated in U.S. Pat. No. 4,547,342. The modified inflator assembly 10 is housed within upper shell or diffuser 14 and lower shell or base 16, which are joined at three simultaneously formed concentric welds 18, 20 and 22. The upper shell 14 and lower shell 16 comprise the inflator housing. The two cylindrical partitions 24 and 26 and the outer cylindrical wall 28 as joined by the three welds define three concentric chambers, innermost igniter chamber 32, intermediate combustion chamber 34 and outermost chamber 36, which are interconnected through evenly spaced ports 38 and 40 in the respective cylindrical partitions 24 and 26. Outer cylindrical wall 28 also contains evenly spaced ports 42 which guide the generated gas to the interior of an associated airbag (not shown). The igniter chamber 32 contains an initiator 56, which may be a conventional electric squib having electric terminals which are connected to an external crash sensing means (not shown). The initiator is in close proximity to an igniter charge assembly 45, comprising a rupturable aluminum container 46 containing an ignition material, such as a granular mixture of boron and potassium nitrate. The igniter chamber may also contain an auto-ignition device which initiates ignition when the inflator is subjected to elevated external temperatures as might occur in a vehicle or warehouse fire. The auto ignition device is designed to ignite at temperatures below those at which the aluminum housing loses its strength, thereby assuring that the aluminum housing does not disintegrate as a result of ignition. Intermediate combustion chamber 34 contains pellets 62 of a gas generant composition surrounded by a screen assembly 64. Retainer disk 68 is provided to hold the pellets 62 and screen assembly 64 in place during the inertial welding step which results in the welds 18, 20 and 22. Outermost chamber 36 contains a deflector ring 84 having an inwardly curved flange 86 at its upper end. At its lower end the deflector ring 84 engages a shaped porous structure 89, which can be formed by compressing a woven wire mat or from a porous sintered ceramic material. A diffuser filter assembly 90 is provided in the upper part of chamber 36. The filter assembly 90 is separated from porous structure 89 by baffle washer 91 which directs the flow of generated reaction products from porous structure 89 through the filter assembly 90.

In the event of a collision, the crash sensing means (not shown) provides an electric impulse to squib 56 causing it to fire into and pierce the aluminum container 46 causing the igniter material to ignite, further rupturing the aluminum container 46. The resulting hot ignition reaction products flow through ports 38 into the intermediate combustion chamber 34 and into contact with the gas generant pellets 62 causing them to release a large quantity of inflation reaction products. The inflation reaction products, consisting primarily of sufficient generated gas to inflate an associated airbag, flow outwardly successively through the pellets 62, through the screen assembly 64 and through the ports 40. After passing through ports 40, the reaction products impinge on the deflector ring 84 and are directed to and through porous structure 89. The reaction products exit porous structure 89 directly outside of deflector ring 84 and are directed through filter assembly 90 and port 42 to be discharged to, or directed to, the inside of an associated airbag (not shown), thereby inflating same.

While the inflator as described above has worked well with metal azide gas generants, the previously noted problems of burn through, ablation, etc. have occurred in developmental testing of such inflators using the newer non-azide or high reaction temperature gas generants. According to this invention, the inside of the inflator housing, i.e. inside surfaces of upper shell or diffuser 14 and lower shell or base 16, are provided with a protective layer comprising a coating of a suitable high-temperature, reactivity resistant material. The previously mentioned ceramics, oxides, or metals, such as boron nitride, aluminum silicate, calcium silicate, alumina, silica, zirconia, nickel, zinc or copper, are suitable for forming such coatings. We have found that an anodized aluminum layer provided on the aluminum housing is particularly suitable.

Figure 2:
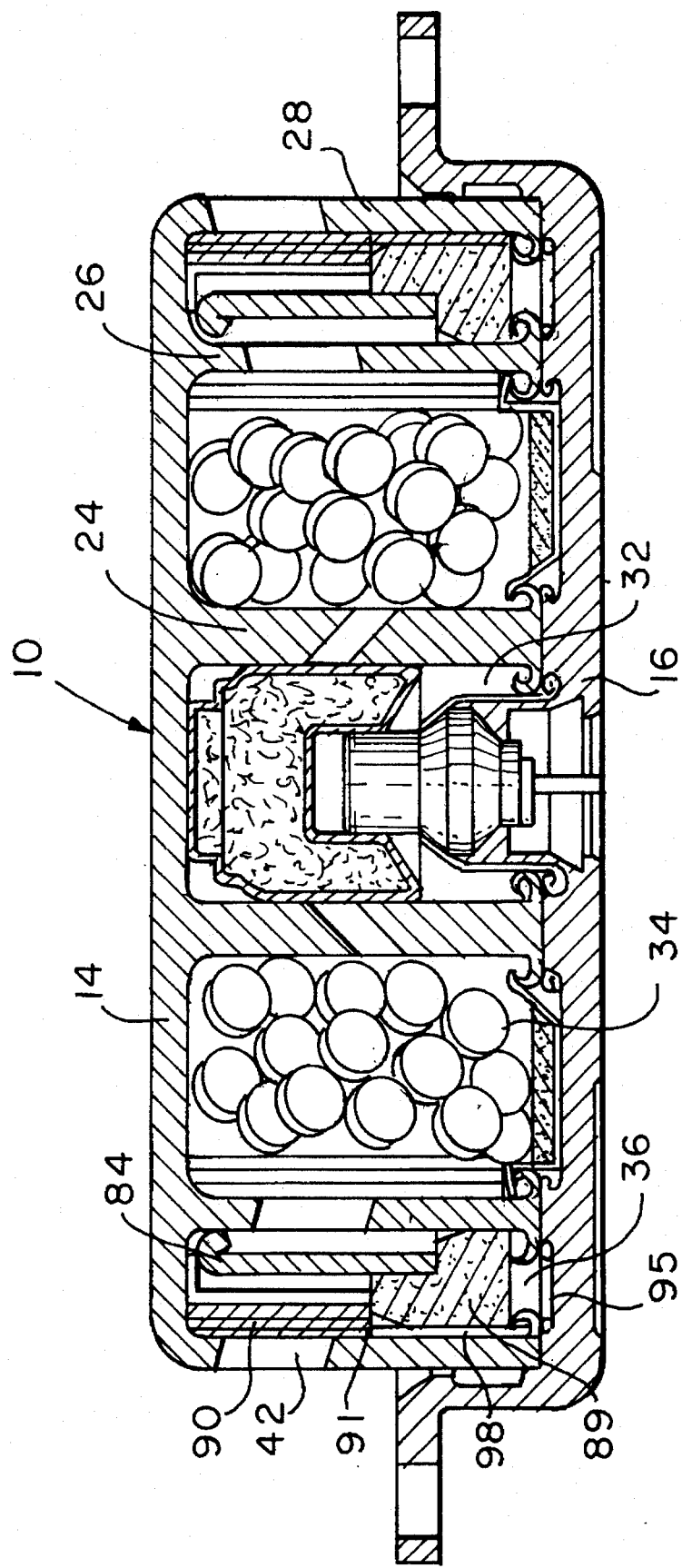
FIG. 2 is a sectional view of a modified version of the inflator of FIG. 1 which incorporates several protective layer structures, or shields, according to the present invention.

It is not necessary that the entirety of the internal surfaces of the housing be provided with a protective layer, however, doing such is often more convenient and/or economical than otherwise. Protective layers should be applied to those internal surfaces of the combustion chamber 34 which are opposite external surfaces of the inflator, and at those locations where the reaction products are at high temperature and impinge heavily on the structure surface. Accordingly, a protective layer should be applied to the housing in the vicinity of the ports 40 through which the generated reaction products flow at a relatively high velocity in passing from the combustion chamber 34 to the outermost chamber 36. Further, shielding should be applied over the internal surface of base 16 at the bottom of outermost chamber 36, where the downward flowing reaction products are caused to reverse direction and flow upward to the filter assembly 90 and discharge port 42, therein impinging extensively on the bottom of chamber 36. In this location, a separate structure, or shield, can advantageously be provided as the protective layer. The inflator shown in FIG. 2 is a modification of the inflator shown in FIG. 1 wherein like items are designated by the same item numbers. In the FIG. 2 embodiment, the internal surface of the base 16 at the bottom of outermost chamber 36 is shielded by a separate structure 95. This structure is shaped like a flat washer such that it lies on the similarly shaped bottom of chamber 36. It can be prepared by stamping or otherwise being cut to shape from a piece of sheet metal, preferably such as a piece of steel sheet in the range of 0.010 to 0.030 inches thick. Alternatively, a similarly shaped ceramic structure could be used. Such protective layer structures are particularly effective and convenient in protecting those localized portions of the metal housing which encounter heavy impingement of the generated reaction products due to their function of redirecting the overall direction of flow of such reaction products.

Another location where the use of a protective layer comprising a separate structure has proven beneficial is on the outer wall of the upper shell or diffuser 14 adjacent the location of the shaped porous metal structure 89 and baffle washer 91. A hollow cylindrical ring like structure 98 is provided at this location in the embodiment of FIG. 2. Such a hollow cylindrical ring has an outer diameter slightly less than the internal diameter of the cylindrical wall 28 of upper shell or diffuser 14 of the inflator housing. The protective ring can therefore be located closely adjacent the interior surface of such wall. A steel hollow cylindrical ring having a thickness in the range of 0.010 to 0.030 inches is particularly economical and effective. Such a protective layer of a cylindrical ring type structure could be formed with baffle washer 91 as a unitary body. Such would simplify assembly of the inflator since it would reduce the number of components needed to be assembled. As mentioned previously, the increased thickness of the separate protective layer structure (over protective layer coatings) permits the use of materials which the generated reaction products may ablate or otherwise deteriorate to a limited degree, since some degree of deterioration of such structure can occur without jeopardizing the integrity of the underlying portion of the housing.

Figure 3:
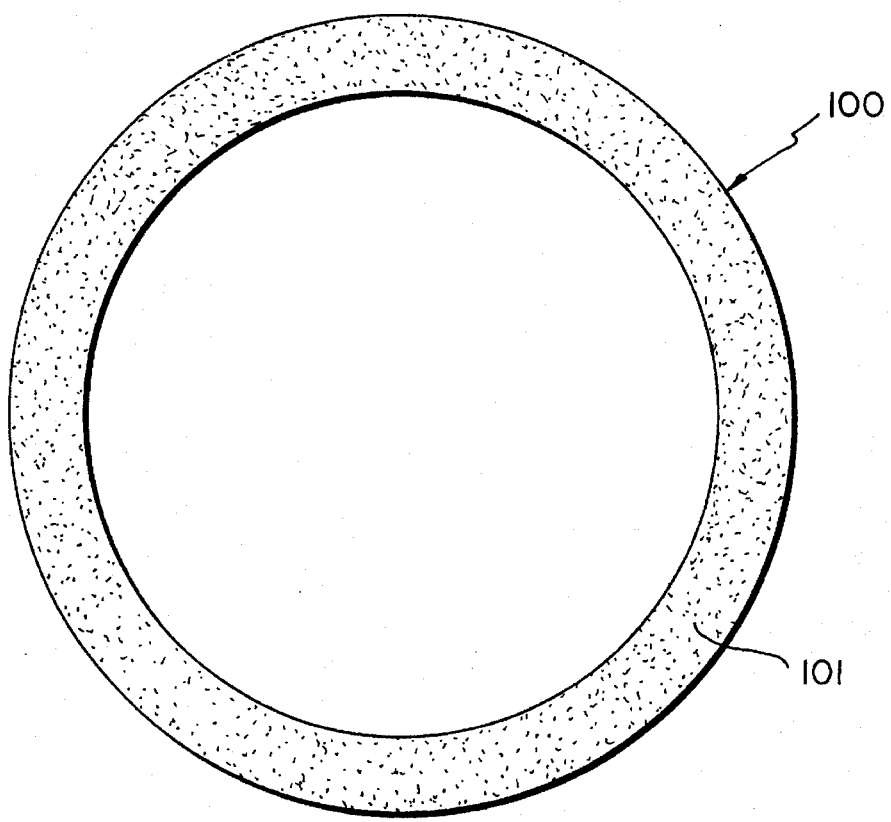
FIG. 3 is a bottom view of a porous structure which has been modified to provide a shield according to the present invention.
Figure 4:
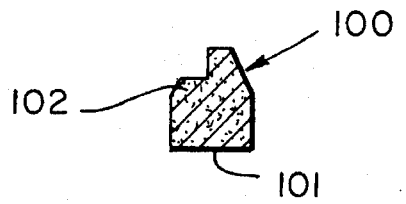
FIG. 4 is a view through a section of the structure shown in FIG. 3.

A further combination of a protective layer structure with an existing component of the inflator is illustrated in FIGS. 3 and 4. FIG. 3 is a bottom view of a modification of the shaped porous structure 89 as used in the gas generators depicted in both FIGS. 1 and 2. FIG. 4 is a cross sectional view through a section of the shaped porous structure of FIG. 3. Such shaped porous structure could be fabricated from a porous ceramic or porous metal mat. The bottom surface 101 of the modified shaped porous structure 100 is fabricated as a solid layer, whereby it does not permit the generated reaction products to contact the housing at the bottom of outermost chamber 36 while permitting the reaction products to pass through the porous upper portion 102 of the structure whereby the gases are cooled and particulates are removed therefrom. The solid bottom layer effectively functions the same as, and replaces, the steel washer 95 illustrated in the embodiment of FIG. 2. The solid layer can be fabricated at the bottom of the porous structure by various techniques. A solid shaped piece could be attached to the bottom of the porous structure, either by fasteners, welding or high temperature adhesives. A preferred method is by applying a ceramic coating on a surface of the shaped porous body by dipping it to the desired thickness in a suspension, or paste, of a ceramic material, such as mullite (aluminum silicate), alumina, silica, zirconia, etc. and post curing the coating, thereby closing the pores at that surface of the porous body. Such a technique could be used to provide a protective layer at any of the surfaces of the porous structures, such as the filters and screens, where a protective layer is determined to be desirable.

The gas generants known as high reaction temperature, or non-azide, generants presently include tetrazole compounds, such as 5-amino tetrazole, tetrazole, bitetrazole and metal salts of these compounds; triazole compounds, such as 1,2,4-triazole-5-one, 3-nitro-1,2,4-triazole-5-one and metal salts thereof; alkali, alkaline earth and transition metal salts of dicyanamide, and mixtures thereof; nitrate salts of amines or substituted amines, such as guanadine nitrate, aminoguanidine nitrate, diaminoguanidine nitrate, triaminoguanidine nitrate, semicarbazide nitrate, ethylenediamine nitrate, hexamethylene tetramine dinitrate and mixtures of such compounds; and salts of 5-nitrobarbituric acid and 5-nitroorotic acid. The gas generant compositions also include an oxidant, such as a nitrogen oxide or a metal or metalloid oxide, such as cupric oxide. A presently preferred high reaction temperature gas generant composition comprises amino tetrazole combined with cupric oxide, sodium nitrate, guanadine nitrate, mica and calcium stearate.

An anodized aluminum coating can be provided on an aluminum housing by typical anodizing methods. Such methods would usually include finishing the surface to be anodized, emulsion cleaning, rinsing, alkaline cleaning, rinsing, chemical etching or dipping and brightening in nitric acid, desmutting, rinsing, anodizing, rinsing and sealing. The anodizing step can be performed by any of the known methods of doing such, the principal of which are the chromic acid process, the sulfuric acid process and the hard annealing process. The anodized coatings can be from approximately 0.2 to 4 mils thick, with the thicker coatings produced by the hard anodizing process being generally preferred for providing an anodized protective layer on those portions of the housing subjected to heavy impingement of the reaction products. However, the nature and composition of the generated reaction products varies depending on the particular gas generant material used. Routine developmental testing should be used to establish which of the anodizing methods work best with a given gas generant material. If the inflator housing is to be assembled with the use of inertial welding or similar techniques, the anodized layer should be removed from the surfaces to be welded by machining or other techniques.

The protective layer concepts described herein are applicable generally to protect inflator housing structures. Routine testing of prototype inflators can identify those portions of the housings thereof which need additional protection, while routine testing of the various protective layers described herein should serve to identify those materials which function best in a particular inflator environment. Accordingly, the invention should not be construed to be limited to the particular embodiments herein described, but should be limited only in accord with the terms of the following claims.

We claim:

1. In a gas generator for a vehicle airbag assembly comprising a metallic housing which encloses a gas generating composition comprising a high reaction temperature gas generant capable of producing a sufficient volume of generated gas to inflate an associated airbag, the improvement comprising a protective layer over a portion of the interior surface of said metallic housing, said protective layer being configured to protect said portion from deterioration by contact with the reaction products produced by the gas generating composition.

2. The gas generator of claim 1, wherein the high reaction temperature gas generant comprises at least one material selected from the group consisting of triazole compounds, tetrazole compounds, salts of 5-nitrobarbituric acid, salts of 5-nitroorotic acid, metal salts of dicyanamide and nitrate salts of amines or substituted amines.

3. The gas generator of claim 1, wherein said protective layer comprises a reactivity resistant material selected from the group consisting of boron nitride, aluminum silicide, calcium silicate, alumina, silica, zirconia, anodized aluminum, nickel, zinc and copper.

4. The gas generator of claim 1, wherein said metallic housing is made of aluminum or an aluminum alloy.

5. The gas generator of claim 4, wherein said protective layer comprises a material selected from the group consisting of metals and ceramics.

6. The gas generator of claim 4, wherein said protective layer comprises a reactivity resistant material selected from the group consisting of boron nitride, aluminum silicide, calcium silicate, alumina, silica, zirconia, anodized aluminum, nickel, zinc and copper.

7. The gas generator of claim 4, wherein said protective layer comprises a coating which is provided on all of the exposed interior surfaces of said metallic housing.

8. The gas generator of claim 4, wherein said protective layer comprises a coating of anodized aluminum.

9. The gas generator of claim 4, wherein said protective layer is provided over a portion of the interior surface of said metallic housing which is subject to impingement by the produced reaction products.

10. The gas generator of claim 9, wherein said protective layer is provided on a portion of said metallic housing which functions to change the direction of flow of the produced reaction products.

11. The gas generator of claim 9, wherein said protective layer is provided on a portion of said metallic housing which functions to define a portion of a passage for directing the gases produced by the gas generating composition to said airbag.

12. The gas generator of claim 9, wherein the protective layer comprises a separate structure located adjacent to said portion of the interior surface of said metallic housing.

13. The gas generator of claim 12, wherein said separate structure is made of an energy blocking material selected from the group consisting of metals and ceramics.

14. The gas generator of claim 13, wherein said energy blocking material is steel.

15. In an airbag system for a vehicle comprising an airbag and a gas generator capable of producing sufficient gas to inflate said airbag, said gas generator comprising an aluminum housing which contains a gas generant material comprising copper oxide and amino tetrazole, the improvement comprising an anodized aluminum layer located on at least a portion of the interior of said aluminum housing so as to provide protection for said portion against deterioration due to contact with reaction products produced by said gas generant material.

16. In a gas generator, for use in a vehicle airbag system, comprising: which generated gas can be discharged,
   (b) a combustion chamber containing a gas generating material capable of producing sufficient generated gas to inflate an airbag,
   (c) flow means for directing said generated gas produced in said combustion chamber to said at least one port, said flow means including surfaces of the housing upon which the generated gas impinges and is diverted;
the improvement comprising a structure of an energy blocking material located adjacent to at least one of said surfaces such that said generated gas impinges on and is diverted by said structure instead of impinging on said at least one of said surfaces thereby providing protection for said at least one of said surfaces against deterioration due to contact with reaction products produced by said gas generating material.

17. The gas generator of claim 16, wherein said gas generating material comprises a high reaction temperature gas generant.

18. The gas generator of claim 17, wherein said high reaction temperature gas generant comprises at least one material selected from the group consisting of triazole compounds, tetrazole compounds, salts of 5-nitrobarbituric acid, salts of 5-nitroorotic acid, metal salts of dicyanamide, nitrate salts of amines and nitrate salts of substituted amines.

19. The gas generator of claim 16, wherein said energy blocking material is selected from the group consisting of metals and ceramics.

20. The gas generator of claim 16, wherein said energy blocking material is made of steel and is adjacent to a portion of said surface which is made of aluminum.

21. The gas generator of claim 16, wherein said structure is fabricated from a flat sheet of said energy blocking material.

22. The gas generator of claim 16, wherein at least a portion of said structure is shaped as a hollow cylinder.

23. The gas generator of claim 16, wherein said flow means include a porous element through which the generated gases pass and wherein said structure is located at one of the surfaces of said porous element.

24. The gas generator of claim 23, wherein said structure is provided by closing the pores at said surface of said porous element.

25. The gas generator of claim 23, wherein said porous element comprises a porous sintered ceramic.

26. The gas generator of claim 23, wherein said porous element comprises a porous metal.

* * * * *

UNITED STATES PATENT AND TRADEMARK OFFICE
CERTIFICATE OF CORRECTION

PATENT NO. : 5,613,705
DATED : March 25, 1997
INVENTOR(S) : Hock et al.

It is certified that error appears in the above-indentified patent and that said Letters Patent is hereby corrected as shown below:

Col. 8, ln. 12, change "comprising: which generated gas can be discharged" to read -- comprising:
  (a) a housing having at least one port in its outer wall from which generated gas can be discharged, --.

Signed and Sealed this

Twenty-fourth Day of June, 1997

Attest:

BRUCE LEHMAN

Attesting Officer

Commissioner of Patents and Trademarks